United States Patent [19]

Cappello et al.

[11] 4,169,054

[45] Sep. 25, 1979

[54] PROCESS FOR CONCENTRATING AND PURIFYING AQUEOUS SULPHURIC ACID SOLUTIONS

[75] Inventors: Franco Cappello, Varazze; Mario Mortigliengo, Borgosesia, both of Italy; Erich Schmoll, Wallisellen; Eduard Kratz, Zürich, both of Switzerland

[73] Assignees: Montedison S.p.A., Milan, Italy; Escher Wyss Aktiengesellschaft, Zürich, Switzerland

[21] Appl. No.: 943,995

[22] Filed: Sep. 20, 1978

[30] Foreign Application Priority Data

Sep. 21, 1977 [IT] Italy .............................. 27798 A/77

[51] Int. Cl.$^2$ .............................................. B01D 1/00
[52] U.S. Cl. .................................... 210/71; 23/305 F; 23/306; 159/DIG. 19
[58] Field of Search ................ 210/71; 23/305 F, 306; 159/DIG. 19

[56] References Cited

U.S. PATENT DOCUMENTS

| 1,960,348 | 5/1934 | Pongratz | 210/71 |
| 3,121,620 | 2/1964 | Zirngibl et al. | 23/306 |
| 3,211,538 | 10/1965 | Gross et al. | 159/DIG. 19 |

*Primary Examiner*—William A. Cuchlinski, Jr.

[57] ABSTRACT

Concentrated sulphuric acid aqueous solutions, stably clear through the time, are obtained starting from diluted sulphuric acid aqueous solutions containing Mg and possibly other impurities such as Fe, Al, Cr, V and Mn, by evaporation concentration. The process is characterized in that, before filtering, the slurry obtained by evaporation concentration, is cooled down to 10°–25° C. and maintained at this temperature for not less than 12 hours.

7 Claims, No Drawings

PROCESS FOR CONCENTRATING AND PURIFYING AQUEOUS SULPHURIC ACID SOLUTIONS

FIELD OF THE INVENTION

The present invention concerns a process for concentrating and purifying aqueous solutions of sulphuric acid containing magnesium and possibly other impurities such as Fe, Al, Cr, V and Mn.

BACKGROUND OF THE INVENTION

Concentrated aqueous $H_2SO_4$ solutions may be obtained by evaporating diluted solutions of any origin and of any concentration.

In general, the solutions most commonly available are those which come from the processes for the production of titanium dioxide via sulphate or from the pickling treatments of metals.

Such solutions usually contain from 5 to 25% by weight of $H_2SO_4$, as well as various impurities such as Mg and possibly Fe, Ca, Al, Cr, V and Mn.

For instance, the solutions coming from the production of titanium dioxide via sulphate, in general have the following composition by weight:

$H_2SO_4$: 15–23%
Mg: 0.07–0.4%
Fe: 1–55
$TiO_2$: 0.06–0.6% and in that solution there are present other impurities such for instance: Ca, Mn, Al, V and Cr.

When diluted aqueous solutions of $H_2SO_4$, containing Mg, are concentrated, for instance up to above 65% by weight, using any known method (for instance by evaporation concentration under vacuum or in submerged flame), it turns out that the precipitation of the Mg is very limited in time. The same phenomenon can be observed, even if on a lower extent, when there are present Al, Fe, V, Cr or Mn.

More particularly, when filtering slurries containing for instance 65–75% by weight of $H_2SO_4$ and 0.1–0.5% by weight of Mg, one obtains a filtrate which at the end of the filtering operation will appear clear but which subsequently will become roiled, often even acquiring a gelatinous consistency. In fact, in the filtrate there continue to precipitate for various days solids that prevailingly consist of magnesium sulphates.

The thus precipitated solids are in the form of crystals with a maximum size not exceeding 10 microns, that is they are extremely fine and bulky, wherefore a possible filtering would prove difficult and would produce cakes with a very high imbibition.

On the other hand, the concentrated sulphuric acid is practically unusable if one does not separate the solid present in the suspension.

THE PRESENT INVENTION

Thus, object of this invention is that of providing a process that will allow the filtering of the aqueous slurries of $H_2SO_4$ containing Mg and possibly Al, Fe, Cr, V and Mn, thereby obtaining concentrated $H_2SO_4$ solutions that will remain stably clear through time.

It has now been found that this object may be achieved if there are adopted suitably controlled times and temperatures in order to bring the slurry obtained by concentration, from the concentration temperature (which is greater than 100° C.) to the filtering temperature, in order to filter the slurry itself and in order to bring the filtrate from the filtering temperature down to the storage temperature.

More particularly, it has been found that it is possible to avoid the formation of Mg precipitates and precipitates of other impurities in the filtrate, so that the filtrate remains clear through time, if the slurry is first cooled down to 10°–25° C., kept at this temperature for not less than 12 hours, and then filtered.

Thus, object of this invention is a process for concentrating and purifying aqueous sulphuric acid solutions containing Mg and possibly other impurities such as Al, Fe, Cr, V and Mn, by evaporation concentration, characterized by the following operations:

(a) cooling down to 10°–25° C. (preferably to 15°–20° C.) of the slurry obtained by evaporation concentration;

(b) keeping at 10°–25° C. (preferably at 15°–20° C.) for a time of not less than 12 hours (preferably not less than 20 hours);

(c) filtering of the slurry.

The cooling mentioned in point (a) may be carried out by passing from the concentration temperature to the temperature of 10°–25° C. in one single step, preferably taking care that the duration of the cooling be of at least 3 hours, or it may be carried out in several steps.

For instance, the slurry may be cooled down first from the initial temperature to 40°–50° C. in a time not exceeding 1 hour, maintained at this temperature for at least 3 hours and finally cooled down to 10°–25° C. (preferably to 15°–20° C.) in a time not exceeding 1 hour.

The filtration of the slurry may be carried out either at 10°–25° C. or preferably at higher temperatures. In this latter case, after the step b, the slurry is heated, preferably to 40°–50° C., the filtration is carried out at this temperature and the filtrate is cooled down to 10°–25° C. in a time not exceeding 1 hour.

The heating to 40°–50° C. which is carried out after step b and the subsequent filtration must be carried out in a short time, preferably in a time not exceeding 1 hour.

Besides the advantage of obtaining a filtrate stably clear through time, the process according to this invention allows to carry out the filtering with a rather high speed in any known type of equipment; in practice, as a matter of fact, one obtains filtration speeds of at least 300 lt/h.m² of filtering surface.

Other advantages, characteristics and possible applications of the process according to this invention may be appreciated by the skilled in the Art by means of the following examples.

EXAMPLE 1

A solution having the following composition (% by weight):

$H_2SO_4$: 55.0% by weight
Mg: 0.20% by weight
Fe: 0.20% by weight
Al: 0.26% by weight
V: 0.04% by weight
Cr: 0.04% by weight
Mn: 0.05% by weight was concentrated by means of evaporation at 115° C. until obtaining a slurry. The liquid of said slurry had the following composition (% by weight):

$H_2SO_4$: 72.83% by weight
Mg: 0.19% by weight

Fe: 0.12% by weight
Al: 0.33% by weight
V: 0.06% by weight
Cr: 0.06% by weight
Mn: 0.02% by weight The slurry thus obtained was cooled down to 15° C. in 20 min. and then maintained at this temperature for 1 hour. Thereupon it was heated for 20 minutes to 45° C. and then filtered in 30 minutes. The filtering speed turned out to be 0.4 m³/h.m²; the clear filtrate starts to roil about 3 hours after the filtering and after 12 hours it acquires a gelatinous consistency.

EXAMPLE 2

In this case example 1 is repeated following the same procedures up to the obtention of the slurry.

The slurry thus obtained was then cooled down in 10 minutes to 45° C. and was then maintained at this temperature for 3 hours whereafter it was cooled down in 10 minutes to 15° C. and maintained at this temperature for 1 hour. At last the flurry was heated up in 10 minutes to 45° C. and then filtered during 40 minutes. The filtering speed was equal to 0.6 m³/h.m²; the clear filtrate starts roiling after about 4 hours after filtration, and after 12 hours it shows a considerable quantity of deposited solid.

EXAMPLE 3

Example 1 was repeated with the same procedures, until obtaining the slurry.

The slurry thus obtained was treated according to procedures of this invention. More particularly, the slurry was cooled down in 15 minutes to 45° C. and then kept at this temperature for 3 hours, after which it was further cooled down in 15 minutes to 15° C. and kept at said temperature for 20 hours. At last the slurry was heated for 15 minutes to 45° C. and filtered in 30 minutes. The filtrate, cooled in 15 minutes to 20° C., had the following composition (% by weight):

$H_2SO_4$: 72.75% by weight
Mg: 0.12% by weight
Fe: 0.067% by weight
Al: 0.30% by weight
V: 0.05% by weight
Cr: 0.06% by weight
Mn: 0.007% by weight and starts roiling only after about 100 hours, but it will remain in such a state that it may be considered in a substantially clear state.

What we claim is:

1. Process for concentrating and purifying aqueous sulphuric acid solutions containing Mg and possibly other impurities such as Al, Fe, Cr, V and Mn, by evaporation concentration, characterized in that the following operations are carried out:
   (a) cooling down to 10°–25° C. of the slurry obtained by evaporation concentration;
   (b) maintaining of the slurry at 10°–25° C. for a time of not less than 12 hours;
   (c) filtering of the slurry.

2. Process according to claim 1, characterized in that the cooling of the slurry down to 10°–25° C. is carried out in a time not less than 3 hours.

3. Process according to claim 1, characterized in that the maintaining of the slurry at 10°–25° C. lasts for a time not less than 20 hours.

4. Process according to claim 1, characterized in that the cooling of the slurry down to 10°–25° C. is carried out by cooling first down to 40°–50° C. in not more than 1 hour, by maintaining this temperature for not less than 3 hours and by then cooling the slurry down to 10°–25° C. in not more than 1 hour.

5. Process according to claim 1, characterized in that before filtering the slurry is heated and after filtering the filtrate is cooled down to 10°–25° C. in not more than 1 hour.

6. Process according to claim 5, characterized in that the heating is carried out up to 40°–50° C. and the heating and filtering are carried out in a total time of not more than 1 hour.

7. Process according to claim 1, characterized in that the slurry is cooled down and maintained at a temperature comprised between 15° and 20° C.

* * * * *